3,352,867
PROCESS FOR PRODUCING GAMMA PHASE
LINEAR QUINACRIDONE
Kazuo Adachi, Masakatsu Hoshikawa, and Kazuaki
Ohira, Tokyo, Japan, assignors to Tekkosha Co.,
Ltd., Tokyo, Japan, a corporation of Japan
No Drawing. Filed Feb. 28, 1966, Ser. No. 530,330
Claims priority, application Japan, June 14, 1965,
40/35,161
11 Claims. (Cl. 260—279)

This invention relates to a new and improved process for the production of gamma crystal phase linear quinacridone.

It is a well known fact that the X-ray diffraction pattern for gamma phase linear quinacridone shows characteristic lines with interplanar spacings of 13.58 A., 3.37 A., 6.47 A., 6.70 A., 3.74 A., 4.33 A., and 5.24 A. Moreover, gamma phase quinacridone is well known as a very useful pigment which has a brilliantly red colour with a blue tint, and which is lightfast, weather stable, chemical resistant, solvent resistant and which has heat stable characteristics.

The previously known processes for the production of gamma phase linear quinacridone can be generally classified into two methods. One of them involves the crystal phase transition method of alpha or beta phase linear quinacridone and the other involves the direct oxidation of 6,13-dihydroquinacridone into gamma phase linear quinacridone. However, these known processes are complicated and only poor yields can be obtained.

An object of this invention is to provide a new and improved process for producing gamma phase linear quinacridone.

Several processes have been disclosed for producing linear gamma phase quinacridone from alpha or beta crystal phase 6,13-dihydroquinacridone, such as in Japanese patent publication No. 13,833/1961. However, in these prior disclosures, the importance of the choice of the solvent and additives has been not mentioned. No complete information on the effects produced by various solvents and various additives has been revealed.

This invention has resulted from detailed studies regarding on the effect of solvents, additives and oxidizing agents on this reaction. According to this invention, the process for production of the gamma linear quinacridone comprises suspending the alpha crystal phase 6,13-dihydroquinacridone, beta crystal phase 6,13-dihydroquinacridone or a mixture thereof in 2-pyrrolidone and the resulting suspension is heated in an atmosphere of molecular oxygen, a gas containing oxygen or in the presence of an oxidizing agent for a very short time. Such heating can be carried out, if desired, in the presence of a small quantity of an alkaline substance, as an additive. The resulting reaction mixture is cooled, and is filtered, and the isolated crystals are washed with hot water and are dried to form the desired product which has a brilliantly red colour with a blue tint. The X-ray diffraction pattern of the thus obtained crystals shows the characteristic pattern of gamma crystal phase quinacridone and no characteristic patterns of the alpha or beta crystal phases of quinacridone were detected.

In the process of this invention, 2-pyrrolidone plays not only a very important role as a medium, but also as an accelerator of the reaction rate, cooperating with the alkaline substance, if used, for the selective formation of gamma phase quinacridone. The alkaline substance can be used in an amount of 0–30%, preferably 0.5–25 weight percent, based on the weight of 6,13-dihydroquinacridone employed.

In the process of this invention, it is believed that alkali or alkaline earth metal salts are formed by the alkaline substance and 2-pyrrolidone, and a catalytic effect is displayed by these salts. The alkaline substances that can be used include potassium hydroxide, sodium hydroxide, calcium hydroxide, potassium carbonate, sodium carbonate, metallic potassium, metallic sodium and other alkaline substances that are able to form salts. The alkaline substances may be added in the solid state, in the form of an aqueous solution, or in any other suitable form as an additive. When no alkaline substance is used, the reaction time is somewhat prolonged. The amount of 2-pyrrolidone used in the reaction is not critical and may be varied appreciably. More than 4 times by weight, preferably within the range of 7–15 times by weight, of 2-pyrrolidone based on the starting weight of 6,13-dihydroquinacridone may be used. The use of larger amounts of 2-pyrrolidone offers neither advantage nor harm.

The reaction rate is accelerated with an increase in reaction temperature. The reaction temperature is also not critical but a temperature between 50–245° C. is preferable. If desired, the reaction time may be shortened to as little as 3 hours at a reaction temperature of 150–245° C.

The gamma crystal phase quinacridone prepared by the process in accordance with the present invention is of small particle size. However, if necessary, it can be easily further reduced in particle size by a conventional method, for example, by "ball milling," without there occurring an undesirable crystal phase transition. As explained above, the process of the present invention has many superior features compared with the prior procedures, i.e., without any preliminary treatment, gamma crystal phase quinacridone can be easily prepared from the alpha or beta crystal phase 6,13-dihydroquinacridone with a shortened reaction time and at a high yield. 2-pyrrolidone once used may be easily recovered by distillation and may be reused in a subsequent operation, which reduces the operating cost.

In order to clearly and easily understand the present invention, the following specific examples are given. These examples are however intended to be merely illustrative of the invention and not limitations thereof.

*Example I*

Into a four-necked flask were placed 10 parts of alpha phase 6,13-dihydroquinacridone which was not previously purified or pulverized, 100 parts of 2-pyrrolidone and 1 part of sodium hydroxide. The contents of the flask were kept at 180° C. under agitation for 2 hours in an atmosphere of oxygen. After completing the reaction, the resulting mixture was cooled to room temperature and the crude product was isolated by filtration, washed repeatedly with hot water till no alkali was detected, and was then dried. 9.9 parts (i.e., 99.6% of the theoretical yield) of gamma phase linear quinacridone of brilliantly red colour with a blue tint were obtained.

*Example II*

Under the same condition as employed in Example I a mixture of 5 parts of alpha crystal phase 6,13-dihydroquinacridone and 5 parts of beta crystal phase 6,13-dihydroquinacridone were kept at 180° C. for 2 hours with 100 parts of 2-pyrrolidone as well as 1 part of sodium hydroxide. 9.7 parts (i.e., 97.6% based on the theoretical yield) of completely pure gamma phase linear quinacridone were obtained.

*Example III*

10 parts of alpha phase 6,13-dihydroquinacridone and 100 parts of 2-pyrrolidone were kept at 200° C., without alkali having been added, under an oxygen atmosphere for 4 hours. After cooling, the resulting reaction mixture was treated in the same manner as in Example I, 9.7 parts of red crystals tinged somewhat strongly with blue were obtained. The crystals were found to contain 85% of gamma phase linear quinacridone.

*Example IV*

10 parts of alpha phase 6,13-dihydroquinacridone, 100 parts of 2-pyrrolidone and 3 parts of potassium hydroxide were kept at 180° C. under agitation in an oxygen atmosphere for 2 hours. The resulting mixture after cooling was treated in the same manner as in Example I. 9.9 parts (i.e., 99.6% based on the theoretical yield) of gamma phase linear quinacridone of softly red colour with blue tint were obtained.

*Example V*

10 parts of beta crystal phase 6,13-dihydroquinacridone were mixed with 100 parts of 2-pyrrolidone and 1 part of sodium hydroxide and kept at 150° C. under agitation for 2 hours in an oxygen atmosphere. After cooling, the resulting reaction mixture was treated in the same manner as in Example I. 9.9 parts (i.e., 99.6% based on the theoretical yield) of gamma phase linear quinacridone of light red colour with blue tint were obtained.

*Example VI*

10 parts of alpha phase 6,13-dihydroquinacridone were dispersed in 70 parts of 2-pyrrolidone with 1 part of potassium hydroxide and the mixture was kept at 245° C. (the boiling point of 2-pyrrolidone) under agitation in an oxygen atmosphere for 1 hour. The resulting reaction mixture was treated in the same manner as in Example I. 9.8 parts (i.e., 98.6% based on the theoretical yield) of completely pure gamma phase linear quinacridone were obtained.

*Example VII*

10 parts of alpha phase 6,13-dihydroquinacridone were dispersed in 70 parts of 2-pyrrolidone, together with 0.5 part of chipped metallic sodium. The mixture was kept at 245° C. under agitation in an oxygen atmosphere for 1 hour. The resulting reaction mixture was treated in the same manner as in Example I. 9.9 parts (i.e., 99.6% based on the theoretical yield) of completely pure gamma phase linear quinacridone were obtained.

*Example VIII*

10 parts of alpha phase 6,13-dihydroquinacridone were dispersed in 200 parts of 2-pyrrolidone and there was added a slurry consisting of 3 parts of sodium bicarbonate in 10 parts of water. The mixture was kept at 120° C. under agitation and air was bubbled through the mixture for 3 hours. The resulting mixture was treated in the same manner as in Example I. 9.9 parts (i.e., 99.6% based on the theoretical yield) of gamma phase linear quinacridone were obtained.

*Example IX*

10 parts of alpha phase 6,13-dihydroquinacridone were dispersed in 100 parts of 2-pyrrolidone and there was added a slurry consisting of 3 parts of potassium carbonate in 6 parts of water. The mixture was kept at 50° C. under agitation while adding air to the mixture for 5 hours. The resulting reaction mixture was treated in the same manner as in Example I. 9.9 parts, i.e., 99.6% based on the theoretical yield) of gamma phase linear quinacridone were obtained.

*Example X*

10 parts of alpha phase 6,13-dihydroquinacridone were dispersed in 100 parts of 2-pyrrolidone, and there were added 4 parts of a 40% potassium hydroxide aqueous solution. The mixture was kept at 80° C. under agitation in an oxygen atmosphere for 3 hours. The resulting reaction mixture was treated in the same manner as in Example I. 9.8 parts (i.e., 98.6% based on the theoretical yield) of completely pure gamma phase linear quinacridone were obtained.

While there have been described various examples of the invention, the specific steps described are not intended to be understood as limiting the scope of the invention as it will be appreciated that changes therein are possible. It is further intended that each element recited in any of the following claims is to be understood as referring to all equivalent elements for accomplishing substantially the same results in an equivalent manner, it being intended to cover the invention broadly in whatever form its principle may be utilized.

We claim:
1. A process for producing gamma phase linear quinacridone which comprises:
   oxidizing a 6,13-dihydroquinacridone selected from the group consisting of alpha crystal phase 6,13-dihydroquinacridone, beta crystal phase 6,13-dihydroquinacridone and a mixture thereof, in 2-pyrrolidone as a dispersion medium at an elevated temperature.
2. A process for producing gamma phase linear quinacridone as set forth in claim 1, wherein the oxidation is carried out at 50–245° C.
3. A process for producing gamma phase linear quinacridone as set forth in claim 1, wherein the amount of 2-pyrrolidone used is from 4–20 times the weight of the 6,13-dihydroquinacridone employed.
4. A process for producing gamma phase linear quinacridone as set forth in claim 2, wherein the amount of 2-pyrrolidones used is from 4–20 times the weight of the 6,13-dihydroquinacridone employed.
5. A process for producing gamma phase linear quinacridone which comprises:
   oxidizing 6,13-dihydroquinacridone suspended in 2-pyrrolidone in the presence of an alkaline substance at an elevated temperature.
6. A process for producing gamma phase linear quinacridone as set forth in claim 5, wherein the oxidation is carried out at 50–245° C.
7. A process for producing gamma phase linear quinacridone as set forth in claim 5, wherein the amount of 2-pyrrolidone used is from 4–20 times the weight of the 6,13-dihydroquinacridone employed.
8. A process for producing gamma phase linear quinacridone as set forth in claim 6, wherein the amount of 2-pyrrolidone used is from 4–20 times the weight of the 6,13-dihydroquinacridone employed.
9. A process for producing gamma phase linear quinacridone as set forth in claim 5, wherein the weight of the alkaline substance is between 0.5–25% based on the weight of the 6,13-dihydroquinacridone employed.
10. A process for producing gamma phase linear quinacridone as set forth in claim 9, wherein the oxidation is carried out at 50–245° C.
11. A process for producing gamma phase linear quinacridone as set forth in claim 9, wherein the amount of 2-pyrrolidone used is from 4–20 times the weight of the 6,13-dihydroquinacridone employed.

References Cited

UNITED STATES PATENTS

| | | | |
|---|---|---|---|
| 2,844,581 | 7/1958 | Manger et al. | 260—279 |
| 3,074,950 | 1/1963 | Deuschel et al. | 260—279 |
| 3,148,075 | 9/1964 | Ehrich | 260—279 |

ALEX MAZEL, *Primary Examiner.*

D. DAUS, *Assistant Examiner.*